(12) United States Patent
Lim et al.

(10) Patent No.: US 7,481,475 B1
(45) Date of Patent: Jan. 27, 2009

(54) CONSOLE ASSEMBLY FOR AN AUTOMOTIVE VEHICLE

(75) Inventors: Daniel Lim, Ann Arbor, MI (US); Nicholas Earl Merkel, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 11/865,331

(22) Filed: Oct. 1, 2007

(51) Int. Cl.
*B60R 9/06* (2006.01)
(52) U.S. Cl. .................................. 296/24.34; 296/37.8
(58) Field of Classification Search .............. 296/24.34, 296/37.8; 312/330.1, 334.1
See application file for complete search history.

(56) References Cited

U.S. PATENT DOCUMENTS

| | | | |
|---|---|---|---|
| 3,356,409 A | 12/1967 | Belsky et al. | |
| 3,857,618 A | 12/1974 | Hagen et al. | |
| 3,901,564 A | 8/1975 | Armstrong et al. | |
| 4,200,342 A | 4/1980 | Fall | |
| 4,955,160 A | 9/1990 | Rock et al. | |
| 6,135,529 A | 10/2000 | De Angelis et al. | |
| 6,203,088 B1 | 3/2001 | Fernandez et al. | |
| 6,655,561 B2 | 12/2003 | Panhelleux et al. | |
| 6,752,444 B2 | 6/2004 | Kitano et al. | |
| 6,921,118 B2 | 7/2005 | Clark et al. | |
| 7,156,438 B2 | 1/2007 | Cowelchuk et al. | |
| 7,186,118 B2 | 3/2007 | Hansen et al. | |

*Primary Examiner*—Joseph D Pape
(74) *Attorney, Agent, or Firm*—Gifford, Krass, Sprinkle, Anderson & Citkowski, P.C.

(57) ABSTRACT

A console assembly for an automotive vehicle having a housing secured to the vehicle which defines a cavity open at one end of the housing. A drawer support extends outwardly from a lower end of the open end of the housing and at least one track is attached to the drawer support. A drawer has a portion dimensioned to fit within the housing cavity and the drawer is movable between a closed position in which the drawer is positioned within the housing cavity, and an open position in which the drawer overlies the drawer support. At least one shoe is attached to the drawer and slidably mounted to the track so that the shoe slides along the track as the drawer is moved between its open and closed positions. At least one elongated bearing slide assembly is also provided between the drawer and the housing to slidably support the drawer.

14 Claims, 2 Drawing Sheets

CONSOLE ASSEMBLY FOR AN AUTOMOTIVE VEHICLE

BACKGROUND OF THE INVENTION

I. Field of the Invention

The present invention relates generally to a console assembly for an automotive vehicle.

II. Description of Material Art

There are many different types of automotive vehicles having front bucket seats and a console positioned in between the two front seats. This console typically includes one or more storage areas accessible by the driver and front passenger of the vehicle for storing various items, such as credit cards, sunglasses, etc.

It is also oftentimes desirable to have a storage drawer mounted within the console that is accessible from the back seat of the automotive vehicle. Such rear drawers are movable between a closed position, in which the drawer is contained within the console, and an open position, in which the drawer extends rearwardly into the back seat area of the vehicle. This drawer is used to store any of a number of different things for easy access to the rear seat passengers of the vehicle.

In order to slidably mount the drawer to the console housing, it has been the previously known practice to use one or more bearing slides between the console housing and the drawer. These bearing slides operate in the conventional fashion and facilitate the sliding movement of the rear drawer between its closed position and its open position.

One disadvantage of these previously known consoles having rearwardly extending storage drawers, however, is that, upon full extension of the drawer to its fully open position, the drawer exhibits excessive springiness due to the limited overlapping contact of the bearing slides. Such springiness, in turn, disadvantageously results in a low quality perception by the users of the vehicle.

SUMMARY OF THE PRESENT INVENTION

The present invention provides a console assembly for an automotive vehicle which overcomes the above-mentioned disadvantages of the previously known console assemblies.

In brief, the console assembly of the present invention comprises a housing which is secured to the vehicle, e.g. the vehicle frame, and thus remains stationary with respect to the vehicle. This housing defines a cavity open at one end of the housing and preferably open to the rear end of the housing.

A drawer support extends outwardly from a lower end of the open end of the housing and preferably rearwardly into the rear seat area of the vehicle. The drawer support is preferably attached to the vehicle while at least one elongated track is contained in the drawer support.

The console assembly further includes a drawer which is dimensioned to fit within the housing cavity. This drawer is movable between a closed position in which the drawer is contained within the interior of the housing, and an open position in which the drawer overlies the drawer support. While in its open position, the top of the drawer is accessible to backseat passengers of the vehicle.

At least one shoe is attached to the drawer adjacent its rear end. This shoe is slidably mounted in the track in the drawer support so that the shoe slides along the track as the drawer is moved between its open and its closed position. Consequently, the interaction between the shoe and the track supports the free end of the drawer as the drawer is moved to its open position.

In order to facilitate the sliding action of the drawer relative to the console housing, at least one and preferably two elongated bearing slide assemblies are operatively connected between the console housing and the drawer. Preferably, these bearing slide assemblies are positioned beneath the bottom of the drawer and are thus hidden from view in use as well as protected from debris.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
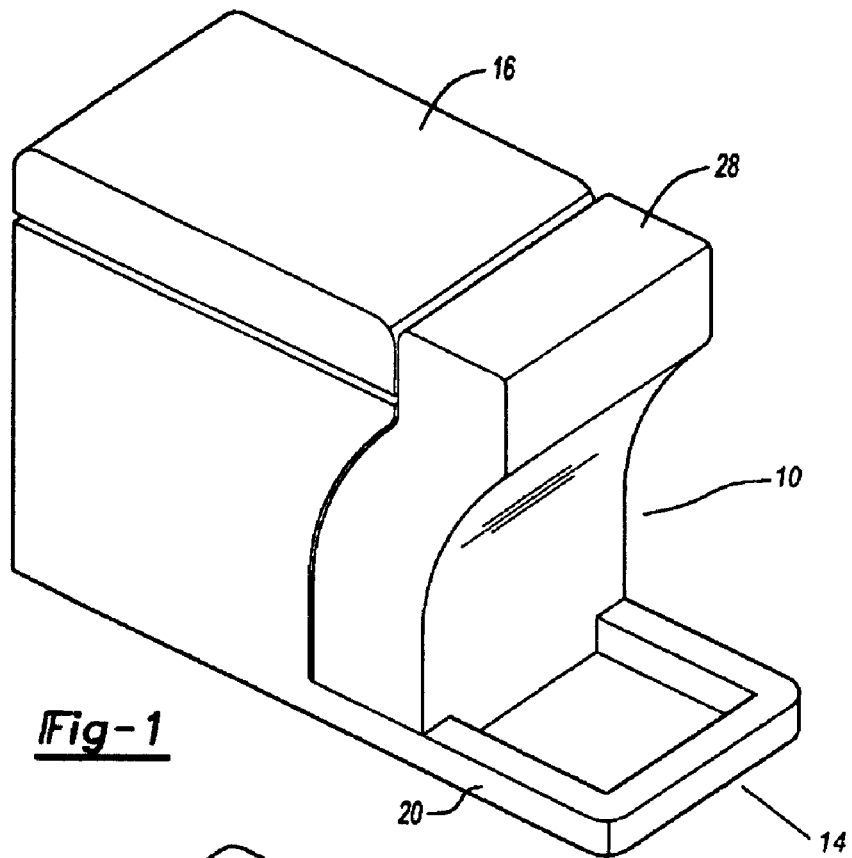
FIG. 1 is an elevational view illustrating a preferred embodiment of the present invention with the drawer in a closed position.

With reference first to FIG. 1, a preferred embodiment of a console assembly 10 according to the present invention is illustrated. The console assembly 10 is positioned between the front bucket seats of an automotive vehicle, only partially illustrated, so that a rear end 14 faces rearwardly towards the rear seat area of the vehicle.

Figure 2:
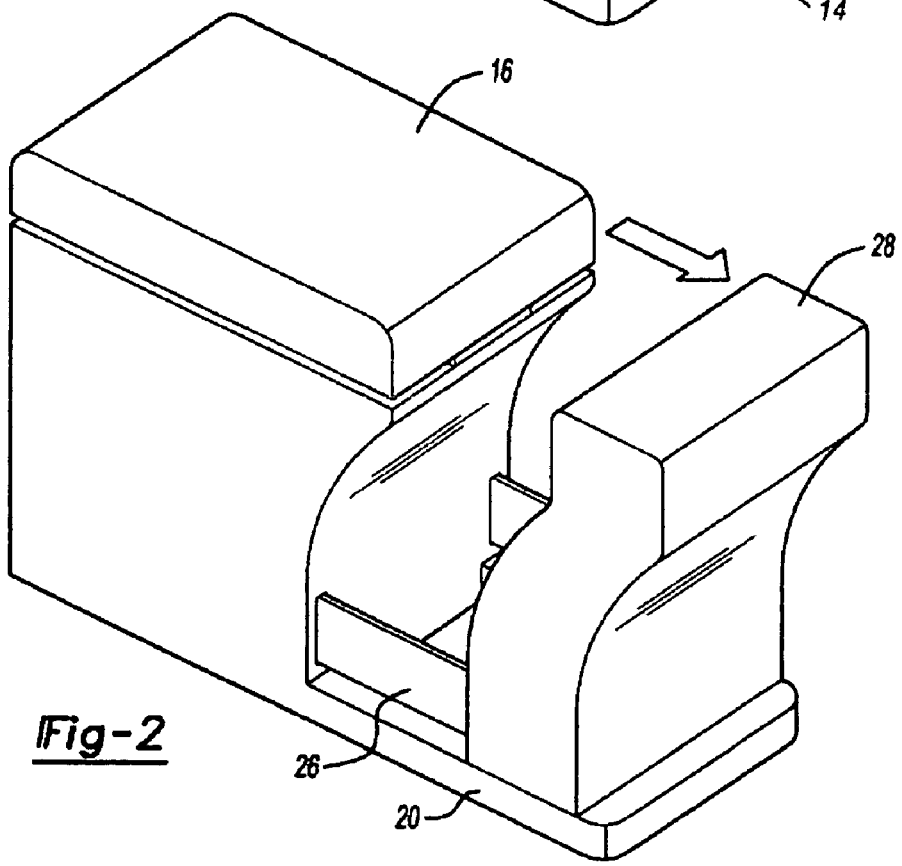
FIG. 2 is a view similar to FIG. 1, but illustrating the drawer in an open position.

The console assembly 10 includes a housing 16 which is secured to the vehicle in any conventional fashion, such as bolts (not shown), so that the housing 16 is stationary relative to the vehicle. The housing 16, furthermore, defines a housing cavity 18 (FIG. 4) which is open at the rear end 14 of the housing 16. With reference now to FIGS. 1 and 2, an elongated drawer support 20 extends outwardly and rearwardly from the housing 16 along the bottom of the housing 16 and thus along the bottom of the cavity 18. This drawer support 20 is preferably attached to the vehicle in any conventional fashion, such as by bolts (not shown). Furthermore, although the housing 16 and drawer support 20 are illustrated as two separate components, alternatively the housing 16 and drawer support 20 may be of a one-piece construction.

Figure 4:
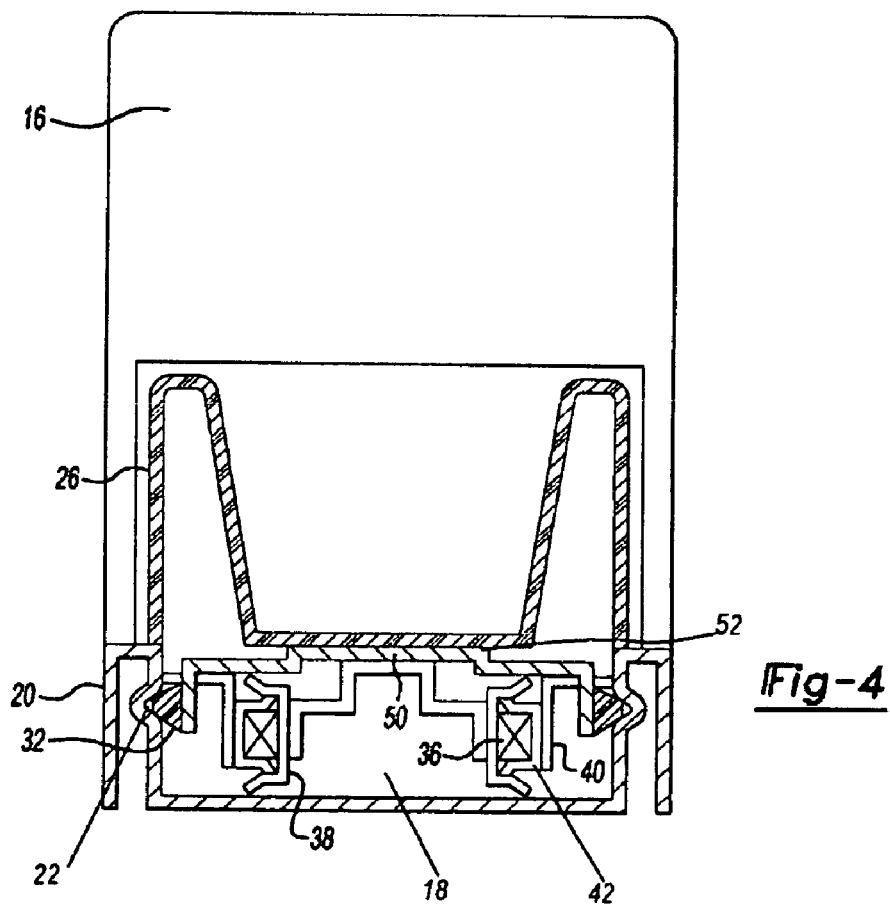
FIG. 4 is a sectional view taken along line 4-4 in FIG. 2 and enlarged for clarity.

As best shown in FIG. 4, a pair of elongated tracks 22 are attached to the drawer support 20 so that one track 22 is positioned adjacent each side 24 of the drawer support 20. The tracks 22 are spaced apart and parallel to each other and are generally V-shaped in cross section. Additionally, each track 22 includes an open side 23 which faces the other track 22.

With reference now to FIGS. 1, 2 and 4, the console assembly 10 further includes a drawer 26 which is movable between a closed position, illustrated in FIG. 1, and an open position, illustrated in FIG. 2. In its closed position, the drawer 26 is positioned within the housing cavity 18. Conversely, when the drawer 26 is in its open position (FIG. 2) the drawer 26 overlies the drawer support 20 so that an open top 28 of the drawer 26 is accessible to occupants of the vehicle, and especially the rear seat occupants.

In order to support the drawer 26 as it is moved between its open position and its closed position, a drawer mount 50 is positioned underneath and secured to a bottom 52 of the drawer mount 50 in any conventional fashion. A pair of shoes 32 in turn are attached to a rear end 34 of the drawer mount 50. Each shoe 32 is complementary in shape to the track 22 so that the tracks 22 slidably support the rear end of the drawer mount 50 and thus the rear end 34 of the drawer 26 by the coaction between the tracks 22 and the shoes 32. In order to further facilitate the sliding movement between the shoes 32 and tracks 22, the shoes 32 are preferably constructed of a synthetic material, such as acetyl.

Figure 3:
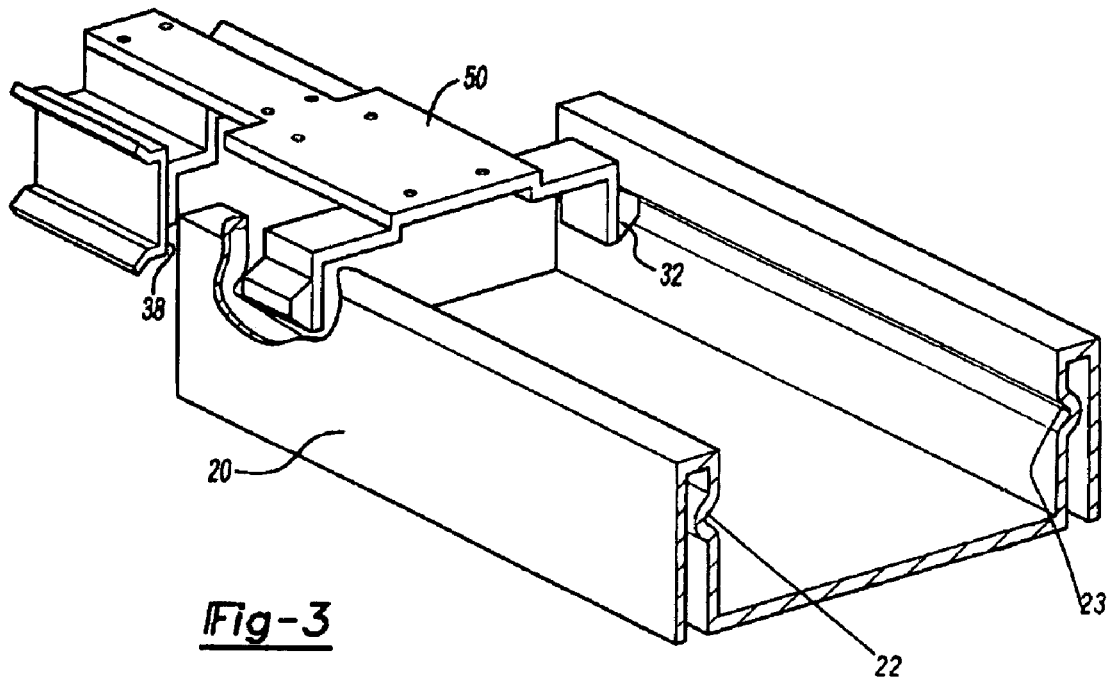
FIG. 3 is a partial fragmentary elevational view of the slide mechanism for the console assembly.

With reference now particularly to FIGS. 3 and 4, at least one, and preferably two, elongated bearing slide assemblies 36 are operatively positioned between the drawer mount 50 and the housing 16. Each slide assembly 36 includes two sections 38 and 40 (FIG. 4) which are respectively attached to the drawer mount 50 and console housing 16. Bearing members 42 positioned between the sections 38 and 40 then facilitate the sliding movement of the drawer 26 between its open and closed position.

In operation, the console housing 16 and drawer support 20 are attached to the vehicle and thus stationary relative to the vehicle 12. With the shoes 32 slidably mounted within their corresponding tracks 22, the coaction between the shoes 32 and tracks 22 support the rear or free end of the drawer 26 as it is moved from its closed and to its open position. Simultaneously, the bearing assemblies 36 facilitate the free sliding movement of the drawer 26 between its open and its closed position. However, since the rear end 34 of the drawer 26 is supported by the shoes 32 and tracks 22, the previously known springiness of the drawer is avoided.

Although the present invention has been described as utilizing a pair of shoes 32 and a pair of tracks 22, it is only necessary to have at least one shoe and at least one track 22. Furthermore, although the invention has been described as utilizing a pair of bearing slide assemblies 36, only a single bearing assembly 36 is required to practice the invention.

Having described my invention, many modifications thereto will become apparent to those skilled in the art to which it pertains without deviation from the spirit of the invention as defined by the scope of the appended claims.

We claim:

1. A console assembly for an automotive vehicle comprising:
    a housing secured to the vehicle, said housing defining a cavity open at one end of said housing,
    a drawer support extending outwardly from a lower end of said open end of said housing,
    at least one track attached to said drawer support,
    a drawer, at least a portion of said drawer dimensioned to fit within said housing cavity, said drawer being movable between a closed position in which said portion of said drawer is positioned within said housing cavity and an open position in which said drawer overlies said drawer support,
    at least one shoe attached to said drawer, said shoe being slidably mounted to said track so that said shoe slides along said track as said drawer is moved between said open and said closed positions,
    at least one elongated bearing slide assembly having two sections which longitudinally slide relative to each other, one of said sections attached to said housing and the other section attached to said drawer.

2. The invention as defined in claim 1 wherein said at least one track comprises at least two tracks, said tracks being attached to opposed sides of said drawer support, and at least two shoes, one shoe being slidably mounted in each track.

3. The invention as defined in claim 2 wherein said tracks are substantially V-shaped in cross section.

4. The invention as defined in claim 3 wherein said shoes have a shape complementary to said tracks.

5. The invention as defined in claim 2 wherein each track has an open side, said open sides of said tracks facing each other.

6. The invention as defined in claim 2 wherein said tracks are spaced apart and parallel to each other.

7. The invention as defined in claim 2 wherein said shoes are constructed of a synthetic material.

8. The invention as defined in claim 7 wherein said shoes comprise acetyl.

9. The invention as defined in claim 2 wherein said shoes are positioned closely adjacent one end of said drawer.

10. The invention as defined in claim 1 wherein said at least one bearing slide comprises a pair of bearing slides.

11. The invention as defined in claim 10 wherein said bearing slides are spaced apart and parallel to each other.

12. The invention as defined in claim 11 wherein said drawer has a bottom and wherein said bearing slides are position beneath said bottom of said drawer.

13. The invention as defined in claim 1 wherein said drawer support is attached to the vehicle.

14. The invention as defined in claim 1 wherein said drawer in said open position is positioned rearwardly of said drawer in said closed position relative to the forward direction of travel of the vehicle.

* * * * *